US011392392B2

United States Patent
Oh et al.

(10) Patent No.: US 11,392,392 B2
(45) Date of Patent: Jul. 19, 2022

(54) PLUG AND PLAY MODULE ASSEMBLY AND PLUG AND PLAY SYSTEM

(71) Applicant: LUXROBO CO., LTD., Seoul (KR)

(72) Inventors: Sanghun Oh, Seoul (KR); Seungbae Son, Seoul (KR)

(73) Assignee: LUXROBO CO., LTD., Seoul (KR)

(*) Notice: Subject to any disclaimer, the term of this patent is extended or adjusted under 35 U.S.C. 154(b) by 68 days.

(21) Appl. No.: 16/631,618

(22) PCT Filed: Nov. 13, 2019

(86) PCT No.: PCT/KR2019/015438
§ 371 (c)(1),
(2) Date: Jan. 16, 2020

(87) PCT Pub. No.: WO2020/141716
PCT Pub. Date: Jul. 9, 2020

(65) Prior Publication Data
US 2021/0326148 A1    Oct. 21, 2021

(30) Foreign Application Priority Data

Dec. 31, 2018    (KR) .......................... 10-2018-0173878

(51) Int. Cl.
*G06F 9/4401*    (2018.01)
*G06F 13/40*    (2006.01)

(52) U.S. Cl.
CPC ........ *G06F 9/4413* (2013.01); *G06F 13/4081* (2013.01)

(58) Field of Classification Search
CPC ............................ G06F 9/4413; G06F 13/4081

USPC ............................................................. 710/8
See application file for complete search history.

(56) References Cited

U.S. PATENT DOCUMENTS

| 4,021,933 A | * | 5/1977 | Hughes | G09B 23/00 434/262 |
| 5,115,235 A | * | 5/1992 | Oliver | G06F 13/4022 340/9.1 |
| 5,988,857 A | * | 11/1999 | Ozawa | G01N 35/00732 198/346.1 |
| 6,067,628 A | * | 5/2000 | Krithivas | G01R 31/3004 710/63 |
| 6,321,335 B1 | * | 11/2001 | Chu | G06F 1/16 726/28 |
| 6,795,318 B2 | * | 9/2004 | Haas | H04M 1/0254 361/728 |
| 9,524,148 B1 | * | 12/2016 | Son | G06F 40/166 |

(Continued)

FOREIGN PATENT DOCUMENTS

KR    10-0408289 B1    12/2003
KR    10-2016-0026523 A    3/2016
(Continued)

*Primary Examiner* — Paul R. Myers
(74) *Attorney, Agent, or Firm* — Birch, Stewart, Kolasch & Birch, LLP

(57) ABSTRACT

Disclosed are a module assembly including: a code transmission module including a functional unit including a PnP code transmission unit transmitting a PnP code to a PnP module; and at least one PnP module driven by receiving the PnP code from the code transmission module, in which the PnP code is a code to drive the PnP module including a different functional unit from the code transmission module, and a plug and play system.

17 Claims, 7 Drawing Sheets

(56) References Cited

U.S. PATENT DOCUMENTS

| | | | |
|---|---|---|---|
| 9,597,607 B2* | 3/2017 | Bdeir | H01R 9/2466 |
| 2002/0198891 A1* | 12/2002 | Li | G06F 16/284 |
| 2006/0015674 A1* | 1/2006 | Murotake | G06F 9/4401 |
| | | | 711/101 |
| 2006/0069452 A1* | 3/2006 | Pfister | H04L 41/0803 |
| | | | 700/18 |
| 2006/0172787 A1* | 8/2006 | Ellis | G06N 3/004 |
| | | | 463/1 |
| 2008/0114476 A1* | 5/2008 | Kay | G06F 1/1601 |
| | | | 700/90 |
| 2010/0224227 A1* | 9/2010 | Lindsey | H02S 50/10 |
| | | | 136/244 |
| 2014/0068689 A1* | 3/2014 | Sirpal | H04N 21/42224 |
| | | | 725/109 |
| 2017/0255451 A1 | 9/2017 | Son et al. | |
| 2017/0256884 A1 | 9/2017 | Kim et al. | |
| 2019/0332553 A1* | 10/2019 | Tertzakian | G06F 13/102 |
| 2020/0232145 A1* | 7/2020 | Jung | D06F 39/02 |

FOREIGN PATENT DOCUMENTS

| | | |
|---|---|---|
| KR | 10-1761596 B1 | 7/2017 |
| KR | 10-1906823 B1 | 12/2018 |

* cited by examiner

[FIG. 1]
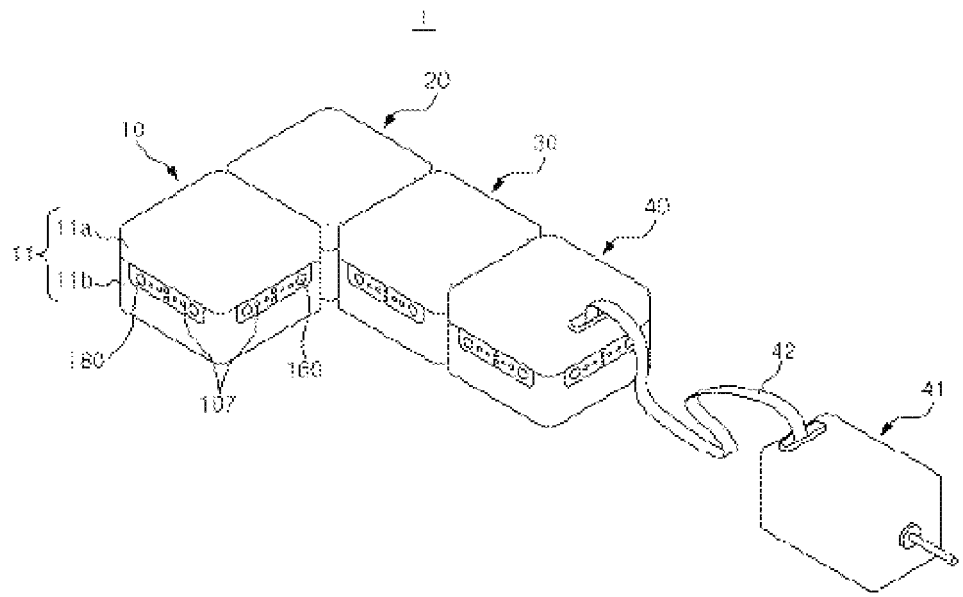
[FIG. 2]
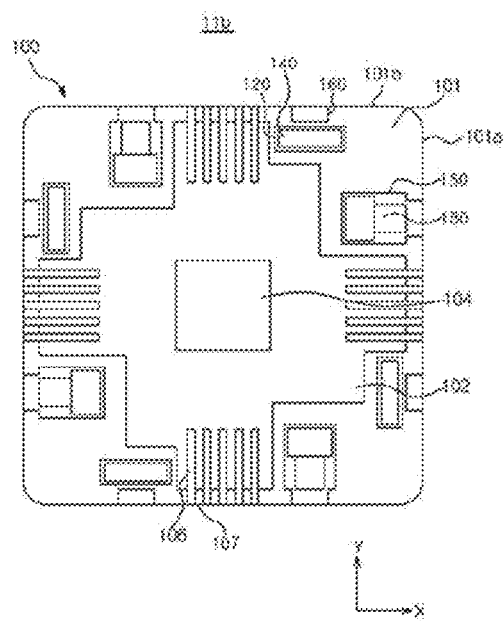

[FIG. 3]
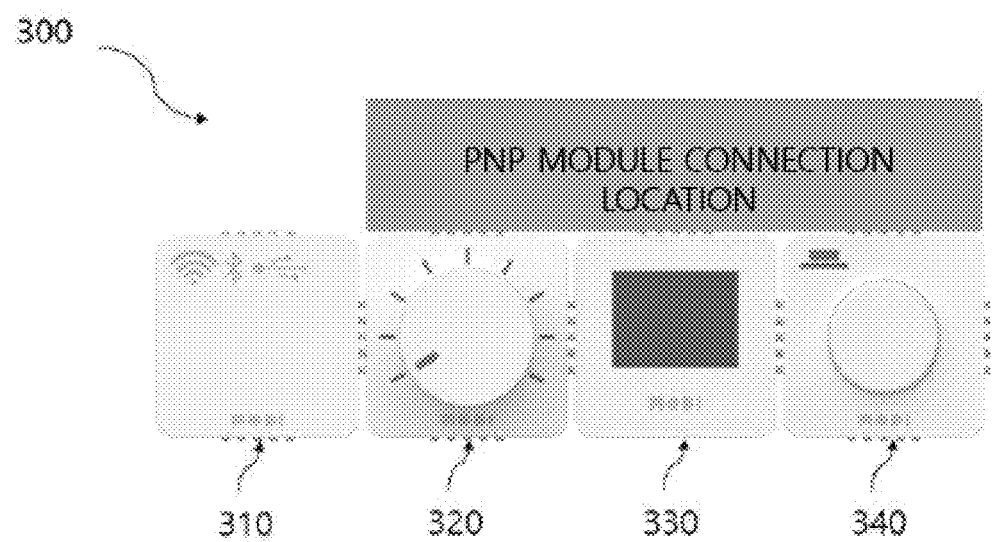
[FIG. 4]
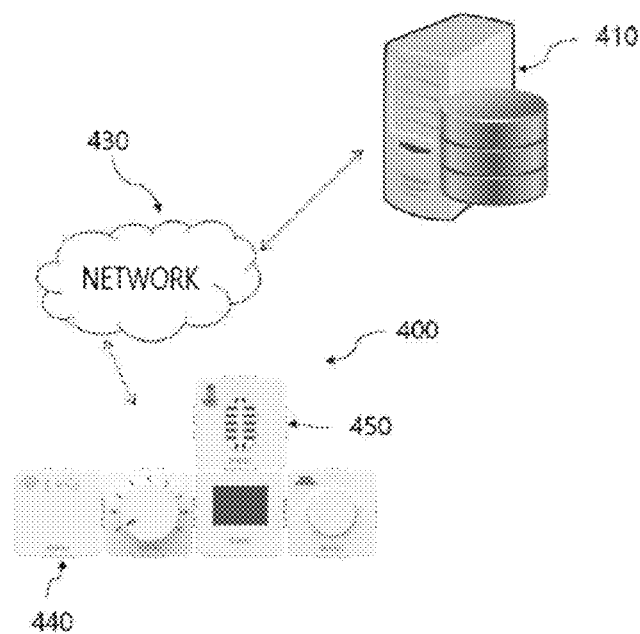

[FIG. 5]
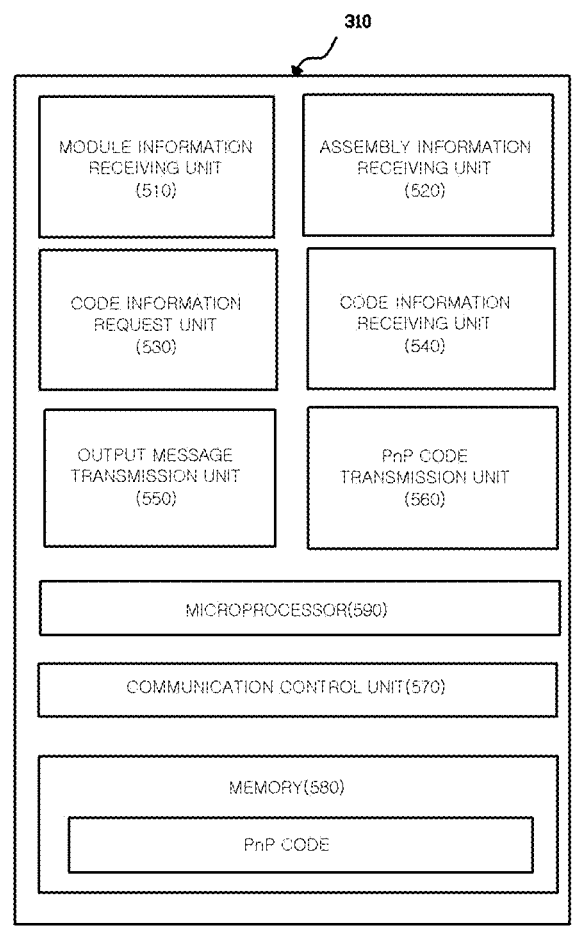

[FIG. 6]
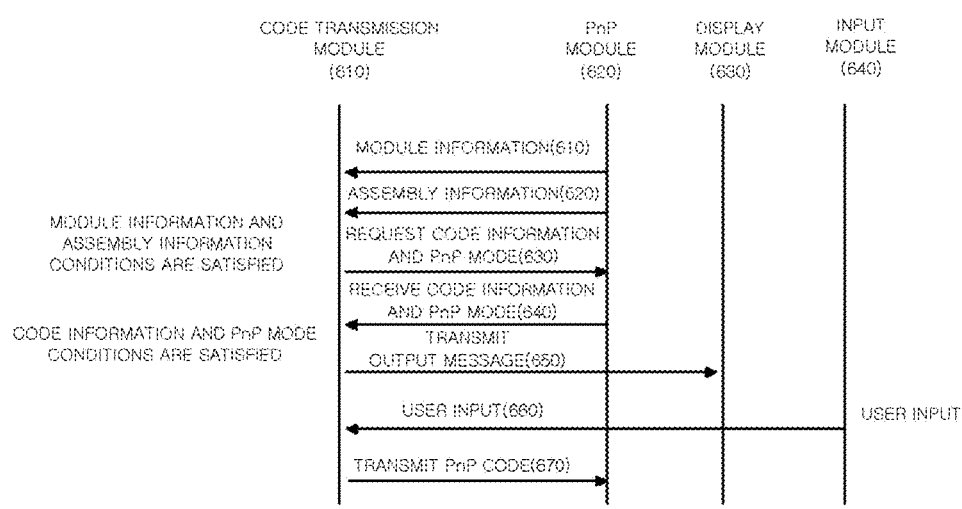
[FIG. 7]

[FIG. 8]
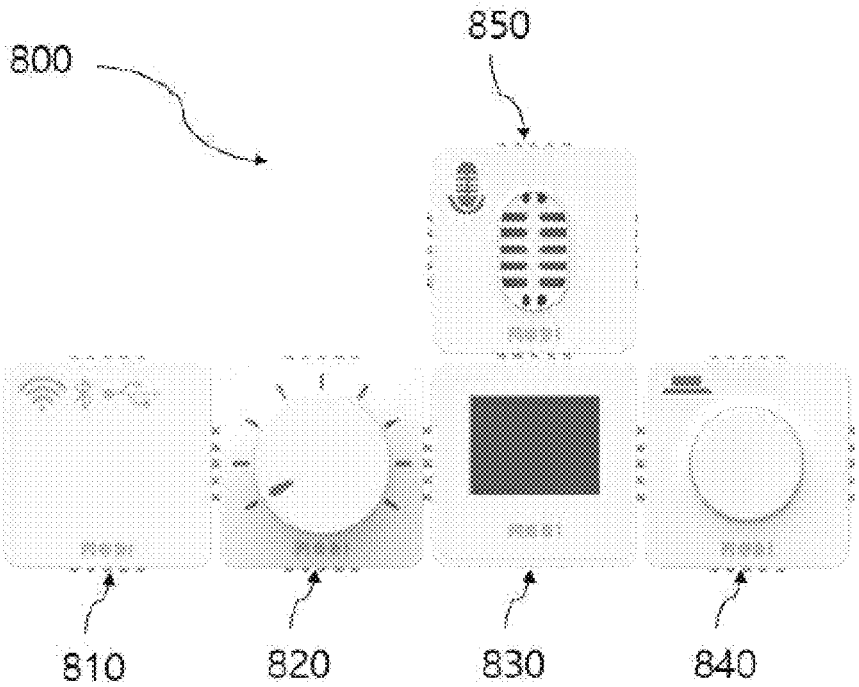
[FIG. 9]
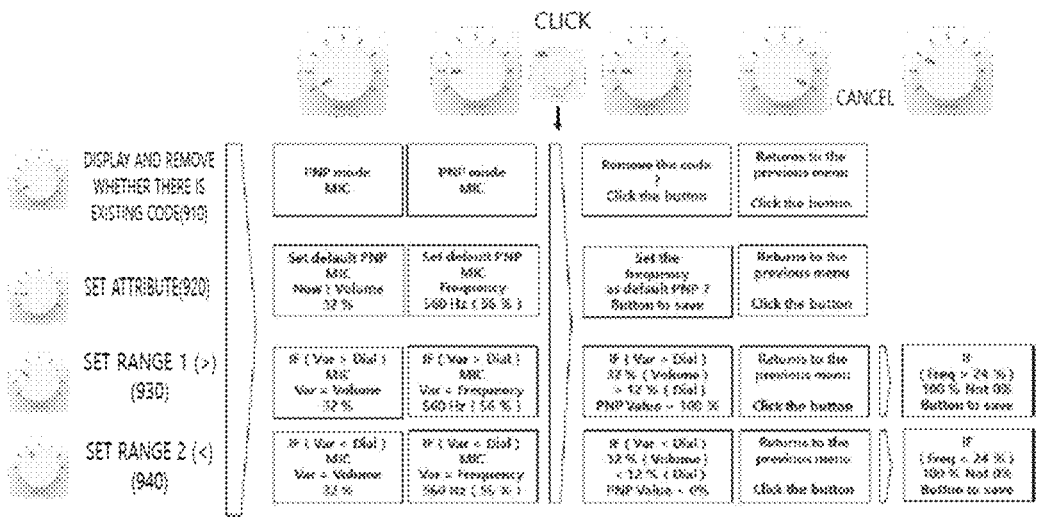

[FIG. 10]
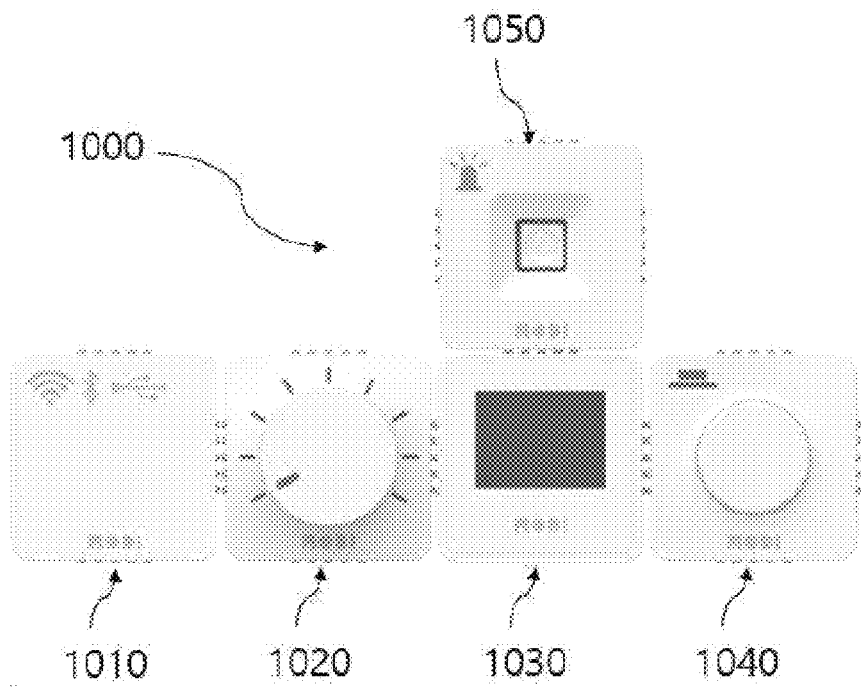
[FIG. 11]
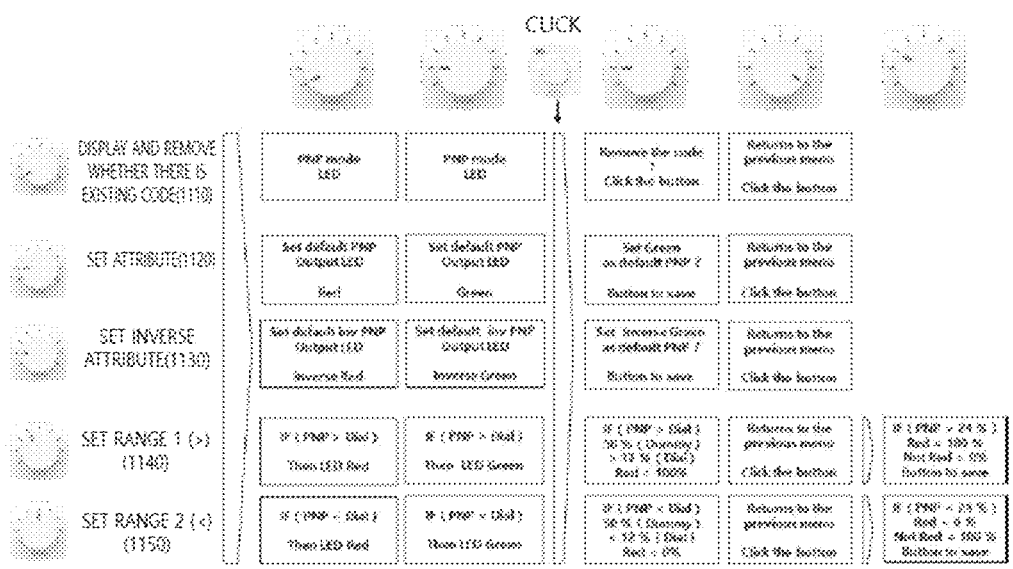

[FIG. 12]
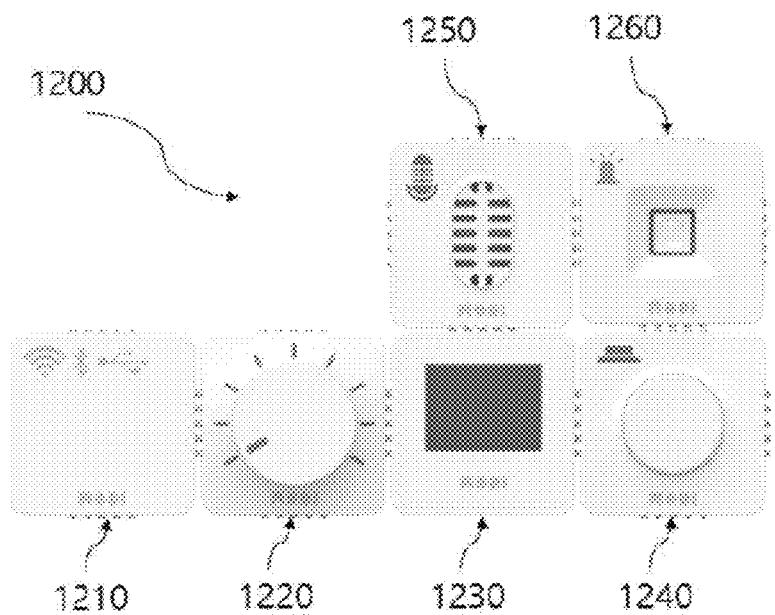
[FIG. 13]
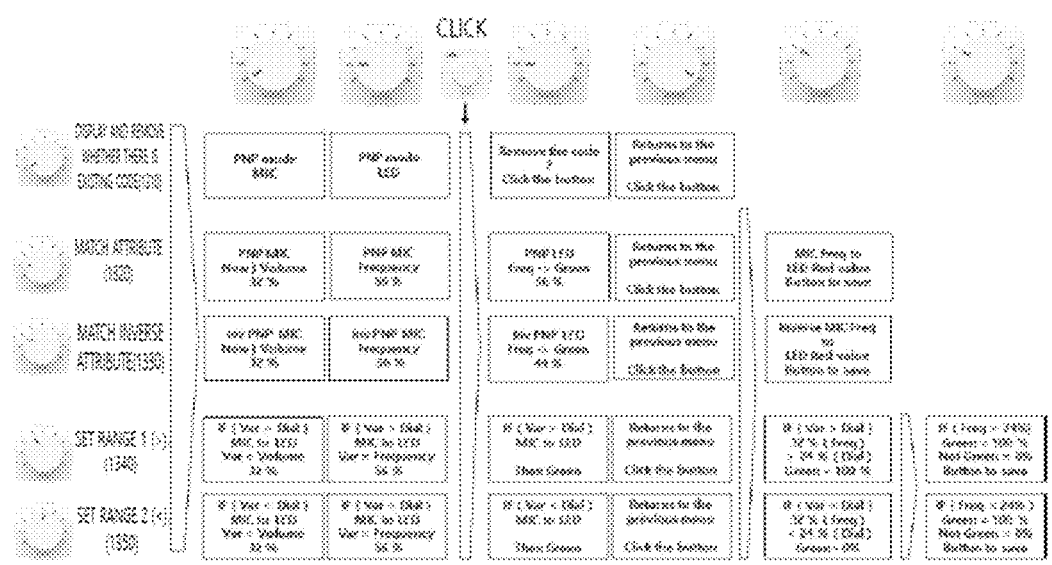

PLUG AND PLAY MODULE ASSEMBLY AND PLUG AND PLAY SYSTEM

CROSS REFERENCE TO RELATED APPLICATIONS

This application is the National Phase of PCT International Application No. PCT/KR2019/015438, filed on Nov. 13, 2019, which claims priority under 35 U.S.C. 119(a) to Korean Patent Application No. 10-2018-0173878, filed in Republic of Korea on Dec. 31, 2018, all of which are hereby expressly incorporated by reference into the present application.

TECHNICAL FIELD

The present invention relates to a plug and play module assembly and a plug and play system, and more particularly, to a plug and play module assembly and a plug and play system including at least one PnP module driven by receiving a plug and play (hereinafter, referred to as PnP) code from a code transmission module and the code transmission module.

BACKGROUND ART

In recent years, various module based fabricating tools for education, hobby, research, production, etc., have been proposed. Modules included in the fabricating tools may perform specific functions, respectively and are provided to be connected to each other to form a module assembly. In this case, respective modules may be provided to be also electrically connected to each other to transmit/receive energy, signals, data, etc. A user can fabricate a module assembly that performs a specific purpose by assembling modules according to a provided manual or an autonomously created scheme.

As one example, Patent Document 1 (Korean Patent No. 1761596) discloses a module assembly fabricated by assembling various types of modules including a network module, a driving module, a sensor module, and the like. In this case, the module assembly may be utilized for various purposes such as an educational kit which allows students or users to appreciate an operational principle of an electronic device while assembling modules 10, 20, 30, and 40, a research kit used for fabricating a device for a researcher to perform a specific purpose, and a toy kit which the user is capable of assembling for a hobby.

Various persons including students, normal persons, and the like in addition to the researcher which is a software or hardware specialist use the module assemblies as mentioned above. However, except for the specialist, it may difficult for the normal persons or students to assemble the module assemblies so that respective modules operate normally and prepare and use software suitable for driving the assembled module assemblies, and as a result, there may be a restriction on dissemination of the module.

Accordingly, a system is required, which provides a plug and play function to provide module information and assembly information of the connected PnP module to a code transmission module and receive a code to drive the PnP module connected from the code transmission module of the module assembly to allow anyone to easily fabricate and utilize a multi-purpose module assembly when a module (hereinafter, referred to as PnP module) is connected to the module assembly so as to operate without an error even when a module assembly being assembled or a module assembly of which assembling is completed is executed.

DISCLOSURE

Technical Problem

The present invention is contrived to cope with the technical problem and an object of the present invention is to provide a plug and play module assembly and a plug and play system capable of substantially compensating various problems which occur by limitations and disadvantages in the related art, which include at least one PnP module driven by receiving a PnP code from a code transmission module and the code transmission module.

Technical Solution

According to an embodiment of the present invention, a module assembly includes: a code transmission module including a functional unit including a PnP code transmission unit transmitting a PnP code to a PnP module; and at least one PnP module driven by receiving the PnP code from the code transmission module, in which the PnP code is a code to drive the PnP module including a different functional unit from the code transmission module.

According to an embodiment of the present invention, the code transmission module further includes a memory, and the PnP code is acquired from the memory of the code transmission module.

According to an embodiment of the present invention, the code transmission module further includes a module information receiving unit and an assembly information receiving unit, the module information receiving unit receives module information from the PnP module, and the assembly information receiving unit receives assembly information from the PnP module.

According to an embodiment of the present invention, the module information includes module unique information and a module category, and the module category represents information to classify the modules according to a function of the PnP module.

According to an embodiment of the present invention, the assembly information includes neighboring module information and a connection direction of the PnP module, and the neighboring module information includes the module unique information and the module category.

According to an embodiment of the present invention, the code transmission module further includes a code information request unit and a code information receiving unit, the code information request unit requests code information and a PnP mode to the PnP module, the code information receiving unit receives the code information and the PnP mode from the PnP module, the code information includes information indicating whether a user code prepared by a user and a PnP code previously received from the code transmission module are present in the PnP module, and the PnP mode includes an on or off setting state of the PnP mode.

According to an embodiment of the present invention, the module assembly further includes a display module and the code transmission module further includes an output message transmission unit, when the code transmission module determines that the user code is not present in the PnP module, but the previously received PnP code is present in the PnP module based on the code information, the output message transmission unit transmits to the display module an input message for inputting whether to remove the previously received PnP code, and when the code transmission module determines that the user code and the previously received PnP code are not present in the PnP module and the PnP mode is an on state based on the code information, the output message transmission unit transmits to the display module an input message for selecting the PnP code.

According to an embodiment of the present invention, the code transmission module is a network module.

According to an embodiment of the present invention, the module assembly further includes a dial module, a button module, and a display module, the PnP module includes at least one of an input module and an output module, the input module is at least one of an environment module, a button module, a gyroscope module, a microphone module, an infrared module, a dial module, and an ultrasound module, and the output module is at least one of an LED module, a speaker module, a display module, a motor controller module, and a motor module.

According to an embodiment of the present invention, the PnP module sets an attribute value of the PnP module by an external input by using the dial module, the button module, and the display module.

According to an embodiment of the present invention, the PnP module receives a range setting mode for the attribute value of the PnP module and an external input value by using the external input by using the dial module, the button module, and the display module and determines whether the external input value compared with the attribute value of the PnP module satisfies a set range.

According to an embodiment of the present invention, when the PnP module includes the input module and the output module, the PnP module matches and sets the attribute value of the input module and the attribute value of the output module by the external input by using the dial module, the button module, and the display module.

Further, according to an embodiment of the present invention, a plug and play system includes: a module assembly including a code transmission module including a functional unit including a PnP code transmission unit transmitting a PnP code to a PnP module, and at least one PnP module driven by receiving the PnP code from the code transmission module; and a PnP code providing server connected to the module assembly through a network, in which the PnP code is a code to drive the PnP module including a different functional unit from the code transmission module.

Advantageous Effects

The following effects are at least achieved by the embodiments of the present invention.

According to the present invention, a plug and play module assembly can be provided, which includes a code transmission module receiving module information and assembly information from a PnP module when the PnP module is connected to a module assembly and transmitting a PnP code capable of driving the PnP module to the PnP module when a condition to operate in a PnP mode is satisfied and at least one PnP module.

Further, according to the present invention, a plug and play module assembly can be provided, which sets an attribute value of the PnP module by an external input or matches and sets attribute values of the PnP modules by using an input module and an output module included in the module assembly.

Further, according to the present invention, a plug and play system can be provided, which includes a code transmission module transmitting a PnP code to drive the PnP module to the PnP module, a module assembly including at least one PnP module, and a PnP code providing server connected to the module assembly through a network to allow the code transmission module to receive the PnP code from the PnP code providing server and transmit the received PnP code to the PnP module.

Accordingly, according to the present invention, a plug and play module assembly and a plug and play system are provided, in which the code providing module of the module assembly transmits a code to drive the connected PnP module when the PnP module is connected to the module assembly to the PnP module to easily design a new module assembly without an error, and as a result, anyone can easily fabricate and utilize a multi-purpose module assembly.

Further, according to the present invention, an output attribute of an output module is matched with an input attribute of an input module to be easily set by connecting various input modules and output modules to the module assembly with the PnP module, and as a result, anyone can easily provide various user experiences.

The effects according to the present invention are not limited by the contents exemplified above, and more various effects are included in the present specification.

DESCRIPTION OF DRAWINGS

FIG. 1 is a perspective view illustrating a state where a module assembly is assembled according to an embodiment of the present invention.

FIG. 2 is a plan view illustrating an internal structure of a module according to an embodiment of the present invention.

FIG. 3 schematically illustrates a module assembly according to an embodiment of the present invention.

FIG. 4 schematically illustrates a plug and play system according to an embodiment of the present invention.

FIG. 5 is a block diagram of a code transmission module according to an embodiment of the present invention.

FIG. 6 schematically illustrates operations of a code transmission module and a PnP module according to an embodiment of the present invention.

FIG. 7 illustrates an output screen of a display module when a PnP module is not connected to a module assembly according to an embodiment of the present invention.

FIG. 8 illustrates a module assembly in which an input module is connected to a PnP module according to an embodiment of the present invention.

FIG. 9 is an exemplary diagram of setting the PnP module of the module assembly of FIG. 8 according to an embodiment of the present invention.

FIG. 10 illustrates a module assembly in which an output module is connected to a PnP module according to an embodiment of the present invention.

FIG. 11 is an exemplary diagram of setting the PnP module of the module assembly of FIG. 10 according to an embodiment of the present invention.

FIG. 12 illustrates a module assembly in which an input module and an output module are connected to PnP modules according to an embodiment of the present invention.

FIG. 13 is an exemplary diagram of setting the PnP modules of the module assembly of FIG. 12 according to an embodiment of the present invention.

MODE FOR INVENTION

The present invention is not limited to the following disclosed embodiments but may be implemented in various different forms. The embodiments are provided only to make description of the present invention complete and to fully announce the scope of the present invention to a person having ordinary skill in the art to which the present invention pertains with the category of the invention, and the present invention will be just defined by the appended claims.

Although the terms "first", "second", and the like are used for describing various components, these components are not confined by these terms. These terms are merely used for distinguishing one component from another component. Therefore, a first component to be mentioned below may be a second component in a technical concept of the present invention.

In this specification, a case where any one component transmits data or signals to another component means that the component can transmit the data or signals directly to another component or transmit the data or signals to another component over at least yet another component.

The features of various embodiments of the present disclosure can be partially or entirely bonded to or combined with each other and can be interlocked and operated in technically various ways so as to be sufficiently appreciated by those skilled in the art, and the embodiments can be carried out independently of or in association with each other.

Hereinafter, a preferred embodiment of the present invention will be described in detail with reference to the accompanying drawings. Like reference numerals in the drawings denote like elements, and the size of elements in the drawings may be exaggerated for clarity of illustration.

FIG. 1 is a perspective view illustrating a state where a module assembly is assembled according to an embodiment of the present invention and FIG. 2 is a plan view illustrating an internal structure of a module.

Referring to FIGS. 1 and 2, a module assembly 1 according to an embodiment of the present invention is constituted by a plurality of modules 10, 20, 30, and 40 which may be assembled to each other.

In the embodiment, the module assembly 1 may be defined as a set of one or more modules 10, 20, 30, and 40 which may be assembled to each other or a structure in which the modules 10, 20, 30, and 40 are assembled and is not limited by a purpose, a type, a form, the number of modules, etc. For example, the module assembly 1 may be a part of an educational kit which allows a student or a user to appreciate an operational principle of an electronic device while assembling the modules 10, 20, 30, and 40. Alternatively, the module assembly 1 may be a part of a research kit which a researcher uses for fabricating a device for performing a specific purpose. Further, the module assembly 1 may be a part of a toy kit which the user may assemble for a hobby.

For easiness of description, in the embodiment, an example in which the module assembly 1 is constituted by four modules 10, 20, 30, and 40 as illustrated in FIG. 1 is described and the module assembly 1 will be referred to as a first module 10, a second module 20, a third module 30, and a fourth module 40, respectively.

Moreover, in the embodiment, the modules 10, 20, 30, and 40 may be defined as objects configured to transmit and receive a signal, data, or electrical energy (hereinafter, an 'electrical signal') represented as a change in voltage or current to and from another module or an external device. The modules 10, 20, 30, and 40 include a central processing unit (CPU), a memory, a power supply, etc., or a sensing means, a processing means, a driving means, etc., which is operable by being controlled by another module to be independently driven, respectively. Further, the respective modules 10, 20, 30, and 40 may be configured to independently perform specific functions or perform specific functions by interaction with another module. When the modules 10, 20, 30, and 40 include the central processing unit, firmware may be installed for each module.

The first module 10 to the fourth module 40 may be, for example, an infrared sensor module which may receive an infrared signal from a remote controller, etc., a wireless communication module which may wirelessly communicate with a smart phone, etc., and a driving module such as a gyroscope sensor module or a motor 41. Further, the first module 10 to fourth module 40 may be connected to an external driving device 41 by a cable 42. In this case, the module assembly 1 may be a device that selectively actuates the motor 41 by receiving the signal of the remote controller or the smart phone. A configuration of the module assembly 1 is just one example and the respective modules may be provided to perform an arbitrary function independently or through interlocking with another module.

The modules 10, 20, 30, and 40 may be a cube having a polygonal pillar shape having a plurality of lateral surfaces which may be in face contact with another module. Here, it should be appreciated that face contact does not mean only that all dimensions of lateral surfaces contact each other and should be appreciated as a meaning including a case where only some of the lateral surfaces contact and the lateral surface of any one module and the lateral surface of another module partially contact each other while facing each other.

In the embodiment, it is illustrated as an example that all of the modules 10, 20, 30, and 40 have a plane having a square shape having the same size. That is, in the embodiment, the modules 10, 20, 30, and 40 have four lateral surfaces. Further, in the embodiment, it is described as an example that heights of the modules 10, 20, 30, and 40 are all formed to be the same as each other, and as a result, all of the modules 10, 20, 30, and 40 are rectangular parallelepipeds having the same size.

As another embodiment, the modules 10, 20, 30, and 40 may be formed in polygonal pillar shapes including a planar right triangular shape, a rectangular shape, a right pentagonal shape, and the like and in particular, formed in a right polygonal shape. Some modules 10, 20, 30, and 40 may have different stereoscopic shapes. Further, some of the modules 10, 20, 30, and 40 may have various stereoscopic shapes including a cone, a polyhedron, and the like.

Here, the first module 10 may include a housing 11 forming an exterior, a terminal 107 which is exposed to the lateral surface of the housing 11 to transfer or receive the electrical signal to another connected module, a pin installation portion 150 where a pin 180 which selectively protrudes to the outside of housing 11 is provided, and a pin receiving portion 160 into which a pin of another module is inserted.

The housing 11 may be, for example, a case formed in a rectangular parallelepiped shape. As illustrated in FIG. 1, the housing 11 may be provided in a form in which an upper case 11a and a lower case 11b are coupled to each other. In a method for configuring the housing 11, the upper case 11a and the lower case 11b may be integrally formed or divided into more parts and assembled as necessary.

The terminal 107 may transfer the electrical signal to another connected module or receive the electrical signal from another module and as one example, may receive the electrical signal from a substrate 102 provided in the housing 11 and transfer the electrical signal to the terminal of another module which contacts the terminal 107. The terminal 107 may have multiple contact points or connection pins and may have various shapes according to a transferring method of the electrical signal, a standardized specification, and the like. Such a terminal 107 may be disposed on one lateral surface of the housing 11 by forming one set with the pin 180, the pin installation portion 150, and the pin receiving portion 160. Specifically, the terminal 107 may be disposed between the pin 180 and the pin receiving portion 160 and may contact the terminal disposed between the pin and the pin receiving portion of another module.

In the embodiment, it is described as an example that the terminal 107 is provided on all lateral surfaces of the housing 11, but there may be a lateral surface without the terminal 107 in some embodiments.

Referring to FIG. 2, the lower case 11b may include a frame 100 forming the external and internal structure, a substrate 102 provided inside the frame 100, and a functional unit 104 installed on the substrate 102.

The frame 100 as a structure that configures a part or the entirety of the housing 11 may provide a space and a structure for forming the exterior of a part or the entirety of the housing 11 and installing various components therein. In the embodiment, it is described as an example that the frame 100 forms the lower case 11b of the housing 11, but the scope of the present invention is not limited thereto. Further, in the embodiment, the frame 100 is formed in a rectangular shape and has four corners 101.

The functional unit 104 for implementing the function of the first module 10 may be mounted on the substrate 102 and may be fixedly installed in an inner space center of the frame 100. The functional unit 104 may include, for example, a microprocessor and in this case, when the first module 10 is driven by independent firmware, the functional unit 104 may be provided in order to control the first module 10. As yet another example, when the first module 10 is an infrared sensor module, the functional unit 104 may include required devices such as an infrared sensor and an analog digital converter (ADC) required for processing a value sensed by the infrared sensor and an interface required for communication with another module or external hardware, e.g., a communication interface such as I2C, UART, or USB.

The types of modules 10 to 40 of the present invention are determined according to the function of the functional unit 104. For example, the functional unit 104 may include the microprocessor and the memory and becomes a control module when the functional unit 104 includes an OS or firmware capable of controlling other units. Alternatively, the functional unit 104 becomes the sensor module when being capable of transferring the sensed value of the sensor to another module or the external device. Alternatively, the functional unit 104 may become a communication module when being capable of transmitting the electrical signal to another external device through the wired/wireless communication device by receiving the electrical signal from another module while including various wired/wireless communication devices including NB-IOT, LTE, LoRa, WiFi, Bluetooth, USB, a cable modem, etc. Alternatively, the functional unit 104 may become a driving module when being actuatable while including various actuator including the motor and the like and actuator control circuits. Other more detailed structures and combinations of the modules of the present invention are disclosed in detail in Korean Patent No. 10-1761596 and included in the specification of the present invention by reference.

FIG. 3 schematically illustrates a module assembly according to an embodiment of the present invention.

A module assembly 300 according to an embodiment of the present invention includes a code transmission module 310. The code transmission module 310 includes a functional unit including a PnP code transmission unit transmitting the PnP code to the PnP module. In an illustrated example, at least one PnP module may be connected to a gray field by user selection and it is apparent to those skilled in the art that the PnP module may be connected to another location. The PnP module may be an input module or an output module according to module category. The module category represents information to classify the modules according to a function of the PnP module. Specifically, the module category is a concept of classifying modules having a similar function to a higher concept based on the function. For example, modules for inputting the electrical signal, such as a sensor, a key, a microphone, etc., may include an input module and an actuator, a display, an LED, etc., may include an output module, the microprocessor, etc., and a control module, a network module, a battery module, a weight display module, etc., capable of executing a program ported by the user may be the module category of the setup module. Table 1 below shows the input module and the output module, and attributes which may be set in respective modules according to an embodiment of the present invention.

TABLE 1

| Module category | Module name | Attributes | Description |
| --- | --- | --- | --- |
| Input module | Environment module | Temperature | Temperature measurement |
| | | Humidity | Humidity measurement |
| | | Illuminance | Illuminance measurement |
| | | Three primary colors (R/G/B) | Red/green/blue illumination value measurement |
| | Button module | One click | Click sensing |
| | | Double click | Double-click sensing |
| | | Pressed state | Pressed state sensing |
| | | Toggle | State value is switched to 0 or 100 each time pressed |
| | Gyroscope module | Rotational angle (Roll/Pitch/Yaw) | X/Y/Z-axis change angle measurement |
| | | Acceleration (X-axis/Y-axis/Z-axis) | X/Y/Z-axis acceleration measurement |
| | | Angular speed (X-axis/Y-axis/Z axis) | X/Y/Z-axis angular speed measurement |
| | | Vibration amount | Vibration amount measurement |
| | Microphone module | Sound volume | Sound volume measurement |
| | | Sound frequency | Sound frequency measurement |
| | Infrared module | Proximity | Proximity measurement |
| | Dial module | Rotational angle | Rotational angle measurement |
| | | Rotational speed | Rotational speed measurement |
| | Ultrasound module | Distance | Distance measurement |
| Output module | LED module | Basic color | Setting four basic colors |
| | | Customer color | Setting 65535 colors |
| | Speaker module | Basic sound | Sound output for scale |
| | | Custom sound | Sound output depending on frequency |
| | Display module | Drawing | Picture output |
| | | Text | Text output |
| | | Horizontal movement | Horizontal movement of picture/text |
| | | Vertical movement | Vertical movement of picture/text |
| | | Reset | Erasing all pictures/texts |

TABLE 1-continued

| Module category | Module name | Attributes | Description |
|---|---|---|---|
| | Motor controller module | Rotational angle | Angle control |
| | | Speed | Speed control |
| | | Torque | Torque control |
| | Motor module | Rotational speed | Rotational speed control |
| | | Rotational range | Rotational range control |
| | | Rotational torque | Rotational torque control |

The module assembly 300 according to an embodiment of the present invention further includes a dial module 320, a button module 340, and a display module 330. The code transmission module 310 receives module information and assembly information from the PnP module when the PnP module is connected. The module information includes the module unique information and the module category. The module unique information may be a module unique identifier such as a Universally Unique identifier (UUID) or a temporary ID assigned during combination in the code transmission module 310. The assembly information includes adjacent module information and a connection direction of the PnP module. The adjacent module information includes the module unique information and the module category.

When the code transmission module 310 determines that a condition is satisfied, in which the PnP module may operate in a PnP mode based on the module information and the assembly information, the code transmission module 310 requests code information and the PnP mode to the PnP module and receives the code information and the PnP module from the PnP module. For example, when it is determined that at least one PnP module of the input module or output module is connected through the module information and the PnP module is connected adjacent to the dial module 320, the button module 340, and the display module 330 through the assembly information, the code transmission module 310 may determine that the condition is satisfied, in which the PnP module may operate in the PnP mode, but it is apparent to those skilled in the art that another determination condition may be set. The code information includes information indicating whether a user code prepared by a user and a PnP code previously received from the code transmission module 310 are present in the PnP module. The PnP mode includes an on or off setting state of the PnP mode.

When the code transmission module 310 determines that the user code is not present in the PnP module, but the previously received PnP code is present based on the code information, the code transmission module 310 transmits to the display module 330 an input message for inputting whether to remove the previously received PnP code. The display module 330 outputs the input message and receives from the user whether to remove the previously received PnP code by using the dial module 320 and the button module 340.

When the code transmission module 310 determines that the user code and the previously received PnP code are not present in the PnP module and the PnP mode is an on state based on the code information, the code transmission module 310 transmits to the display module 330 an input message for selecting the PnP code. The display module 330 outputs the input message for selecting the PnP code and receives from the user PnP code selection by using the dial module 320 and the button module 340. The input message may be an input message for selecting one PnP code among at least one PnP code.

The code transmission module 310 further includes a memory. The selected PnP code is acquired from the memory of the code transmission module 310. The code transmission module 310 transmits the selected PnP code to the PnP module and the PnP module drives the PnP module by using the PnP code.

Detailed components and operations of the code transmission module 310 will be hereinafter described in detail with reference to FIGS. 5 and 6.

FIG. 4 schematically illustrates a plug and play system according to an embodiment of the present invention.

The plug and play system according to the embodiment of the present invention includes a module assembly 400 and a PnP code providing server 410. The module assembly 400 includes a code transmission module 440 and at least one PnP module 450. The code transmission module 440 includes a functional unit 104 including a PnP code transmission unit transmitting the PnP code to the PnP module 450. The PnP module 450 is driven by receiving the PnP code from the code transmission module 440. The PnP code is a code to drive the PnP module 450 including a different functional unit 104 from the code transmission module 440.

The code transmission module 440 further includes a module information receiving unit and an assembly information receiving unit. The module information receiving unit receives module information from the PnP module 450. The module information includes the module unique information and the module category. The module category represents information to classify the modules according to the function of the PnP module 450. The module information receiving unit receives assembly information from the PnP module 450. The assembly information includes neighboring module information and a connection direction of the PnP module 450. The neighboring module information includes the module unique information and the module category.

The code transmission module 440 further includes a PnP code request unit and a PnP code receiving unit. The PnP code request unit transmits the module information and the assembly information to the PnP code providing server 410 to request the PnP code. The PnP code providing server 410 is connected to the module assembly 400 through a network 430. The PnP code receiving unit receives the PnP code of the PnP module 450 from the PnP code providing server 410 as a response to the PnP code request.

The PnP code transmission unit of the code transmission module 440 transmits to the PnP module 450 the PnP code received from the PnP code providing server 410.

As described in the description of the functional unit 104, the functions of the modules 10 to 40 are determined according to the configuration of the functional unit 104. FIG. 5 is a block diagram of a code transmission module 310 according to an embodiment of the present invention.

Referring to FIG. 5, the functional unit 104 of the code transmission module 310 includes a module information receiving unit 510, an assembly information receiving unit 520, a code information request unit 530, a code information receiving unit 540, an output message transmitting unit 550, a PnP code transmission unit 560, a microprocessor 590, a communication control unit 570, and a memory 580. The code transmission module 310 may be a network module including the microprocessor 590, the communication control unit 570, and the memory 580, but it is apparent to those skilled in the art that another module category including the hardware unit may be available.

The module information receiving unit 510 is a software component receiving the module information from the PnP module when the PnP module is connected. The module information includes the module unique information and the module category.

The assembly information receiving unit 520 is a software component receiving the assembly information from the PnP module. The assembly information includes neighboring module information and a connection direction of the PnP module. The neighboring module information includes the module unique information and the module category of the neighboring module. The connection direction is information indicating to which port of the PnP module the neighboring module is physically connected. For example, when there are a communication module and a gyroscope sensor module, an electromagnetic wave of the communication module may influence sensing of the gyroscope sensor module, and as a result, the communication module and the gyroscope sensor module may be mutually disposed by determining the connection direction at a location where the electromagnetic wave does not influence the sensing as possible.

When it is determined that the code transmission module 310 is a PnP module suitable for driving plug and play based on the module information and the assembly information, the code transmission module 310 requests the code information and the PnP mode to the PnP module through the code information request unit 530. For example, when it is determined that at least one PnP module of the input module or output module is connected through the module information and the PnP module is connected adjacent to the dial module 320, the button module 340, and the display module 330 through the assembly information, the code transmission module 310 may determine that the condition is satisfied, in which the PnP module may operate in the PnP mode, but it is apparent to those skilled in the art that a determination condition suitable for driving the plug and play may be modified and set.

The code information receiving unit 540 receives the code information and the PnP mode from the PnP module as responses the code information and the PnP mode request. The code information includes information indicating whether a user code prepared by a user and a PnP code previously received from the code transmission module 310 are present in the PnP module. The PnP mode includes an on or off setting state of the PnP mode.

When the code transmission module 310 determines that the user code is not present in the PnP module, but the previously received PnP code is present based on the code information, the output message transmission unit 550 transmits to the display module 330 an input message for inputting whether to remove the previously received PnP code. The display module 330 outputs the input message and receives from the user whether to remove the previously received PnP code by using the dial module 320 and the button module 340.

On the contrary, when the code transmission module 310 determines that the user code and the previously received PnP code are not present in the PnP module and the PnP mode is an on state based on the code information, the output message transmission unit 550 transmits to the display module 330 an input message for selecting the PnP code. The display module 330 outputs the input message for selecting the PnP code and receives from the user PnP code selection by using the dial module 320 and the button module 340. The input message may be an input message for selecting one PnP code among at least one PnP code.

The code transmission module 310 acquires the selected PnP code from the memory 580 and the PnP code transmission unit 560 transmits the selected PnP code to the PnP module. The PnP module is driven by receiving the PnP code from the code transmission module 310. That is, the PnP code serves as a driver for driving the PnP module.

The communication control unit 570 may control communication with an external device and communication between the modules. The communication with the external device may include various wired/wireless communication including NB-IOT, LTE, LoRa, WiFi, Bluetooth, USB, a cable modem, etc. Meanwhile, the communication between the modules may perform inter-module communication by using various internal communication means including UART, I2C, LIN, CAN, etc. The communication control unit 570 may include various wired/wireless communication means or the communication means between the modules and perform communication by a scheme of controlling a separate network module when being connected to the separate network module.

The memory 580 includes various information and software required for operating the code transmission module 310 and the module assembly 300. The memory 580 according to the embodiment of the present invention includes the PnP code to drive each of at least one PnP module including a different functional unit from the code transmission module 310. The PnP code may be stored in the memory in advance by an external input or received from the PnP code providing server 410 connected to the module assembly 300 through the network and stored in the memory, but it is apparent to those skilled in the art that the PnP code may be stored in the memory by another method.

The microprocessor 590 is a computation device for executing the module information receiving unit 510, the assembly information receiving unit 520, the code information request unit 530, the code information receiving unit 540, the output message transmission unit 550, the PnP code transmission unit 560, and the communication control unit 570 and those skilled in the art may appropriately select and implement the microprocessor 590 required for the code transmission module 310.

FIG. 6 schematically illustrates operations of a code transmission module and a PnP module according to an embodiment of the present invention.

In step 610, a code transmission module 610 receives the module information from a PnP module 620 when the PnP module 620 is connected. The module information includes the module unique information and the module category. The module category represents information to classify the modules according to the function of the PnP module.

In step 620, the code transmission module 610 receives the assembly information from the PnP module 620. The assembly information includes neighboring module information and a connection direction of the PnP module 620. The neighboring module information includes the module unique information and the module category.

When it is determined that the code transmission module 610 is the PnP module 620 suitable for driving the plug and play based on the module information and the assembly information, the code transmission module 610 requests the code information and the PnP mode to the PnP module 620 in step 630. The code information includes information indicating whether a user code prepared by a user and a PnP code previously received from the code transmission module

610 are present in the PnP module 620. The PnP mode includes an on or off setting state of the PnP mode.

In step 640, the code transmission module 610 receives the code information and the PnP mode from the PnP module 620 as the responses to the code information and the PnP mode request.

When the code transmission module 610 determines that the user code is not present in the PnP module 620, but the previously received PnP code is present based on the code information, the code transmission module 610 transmits to the display module 630 an input message for inputting whether to remove the previously received PnP code in step 650.

When the code transmission module 610 determines that the user code and the previously received PnP code are not present in the PnP module 620 and the PnP mode is an on state based on the code information, the code transmission module 610 transmits to the display module 630 an input message for selecting the PnP code in step 650.

In step 660, the code transmission module 610 receives from the input module 640 an input for whether to remove the previously received PnP code or a PnP code selection input.

In step 670, the code transmission module 610 transmits the selected PnP code to the PnP module 620. The PnP module 620 drives the PnP module 620 by using the PnP code.

FIG. 7 illustrates an output screen of a display module when a PnP module is not connected to a module assembly according to an embodiment of the present invention.

The module assembly 300 illustrated in FIG. 3 includes the code transmission module 310, and the input module and the output module. In the illustrated example, the input module includes the dial module and the button module 340. The output module includes the display module 330. In the illustrated example, at least one PnP module may be connected to the module assembly 300 at a gray location by user selection and it is apparent to those skilled in the art that the PnP module may be connected to another location.

When the code transmission module 310 determines that the PnP module is not connected, the code transmission module 310 transmits a message for requesting connection of the PnP module to the display module 330 as illustrated in FIG. 7. The display module 330 outputs the message for requesting the connection of the PnP module. When the code transmission module 310 does not receive the module information and the assembly information from the PnP module within a predetermined time, the code transmission module 310 may determine that the PnP module is not connected, but it is apparent to those skilled in the art that another determination condition may be set.

FIG. 8 illustrates a module assembly in which an input module is connected to a PnP module according to an embodiment of the present invention.

In the illustrated example, the module assembly 800 includes a microphone module 850 which is an input module as the PnP module. Further, the module assembly 800 includes a code transmission module 810, a dial module 820, a button module 840, and a display module 830.

FIG. 9 is an exemplary diagram of setting the PnP module of the module assembly of FIG. 8 according to an embodiment of the present invention.

When the code transmission module 810 determines that the user code is not present in the microphone module 850 and the previously received PnP code is present based on the code information as described in FIGS. 5 and 6, the code transmission module 810 transmits to the display module 830 an input message for inputting whether to remove the previously received PnP code (910). The display module 830 outputs the input message and selects the output input message by using the dial module 820 and confirms the selection by using the button module 840 to receive from the user whether to remove the previously received PnP code.

The microphone module 850 sets the attribute value of the microphone module 850 by the external input by using the dial module 820, the button module 840, and the display module 830 (920). The microphone module 850 of the illustrated example includes a sound volume and a sound frequency as attributes. In the illustrated example, the user selects an attribute value setting mode by using the dial module 840 and confirms the selection by using the button module 840. Thereafter, the user selects the attribute and the attribute value of the microphone module 850 by using the dial module 820 and confirms the selection by using the button module 840.

The microphone module 850 receives a range setting mode and an external input value for the set attribute value of the microphone module 850 by the external input by using the dial module 820, the button module 840, and the display module 830 and determines whether the external input value compared with the set attribute value of the microphone module 850 satisfies a set range (930 and 940).

In the illustrated example, the user selects a range setting mode of '>' of the microphone module 850 by using the dial module 820 and confirms the selection by using the button module 840. An attribute to input the external input value and the external input value are input by using the dial module 820 and the button module 840. When the external input value compared with the set attribute value satisfies a range of '>', a 'TRUE' (100%) value is returned and when the external input value does not satisfy the range of '>', a 'FALSE' (0%) value is returned. In the illustrated example, since an attribute value of a sound volume is '32%' and the external input value is '12%', the external input value compared with the set attribute value satisfies the range of '>', and as a result, the TRUE value is returned.

Further, in the illustrated example, the user selects a range setting mode of '<' of the microphone module 850 by using the dial module 820 and confirms the selection by using the button module 840. An attribute to input the external input value and the external input value are input by using the dial module 820 and the button module 840. When the external input value compared with the set attribute value satisfies a range of '<', the 'TRUE' (100%) value is returned and when the external input value does not satisfy the range of '<', the 'FALSE' (0%) value is returned. In the illustrated example, since the attribute value of the sound volume is '32%' and the external input value is '12%', the external input value compared with the set attribute value does not satisfy the range of '<', and as a result, the FALSE value is returned.

FIG. 10 illustrates a module assembly in which an output module is connected to a PnP module according to an embodiment of the present invention.

In the illustrated example, the module assembly 1000 includes an LED module 1050 which is the output module as the PnP module. Further, the module assembly 1000 includes a code transmission module 1010, a dial module 1020, a button module 1040, and a display module 1030.

FIG. 11 is an exemplary diagram of setting the PnP module of the module assembly of FIG. 10 according to an embodiment of the present invention.

When the code transmission module 1010 determines that the user code is not present in the LED module 1050 and the previously received PnP code is present based on the code information as described in FIGS. 5 and 6, the code transmission module 1010 transmits to the display module 1030 an input message for inputting whether to remove the previously received PnP code (1110). The display module 1030 outputs the input message and selects the output input message by using the dial module 1020 and confirms the selection by using the button module 1040 to receive from the user whether to remove the previously received PnP code.

The LED module 1050 sets the attribute value of the LED module 1050 by the external input by using the dial module 1020, the button module 1040, and the display module 1030 (1120). The LED module 1050 of the illustrated example includes a basic color and a customer color as the attributes. In the illustrated example, an attribute value setting mode is selected by using the dial module 1020 and the selection is confirmed by using the button module 1040. Thereafter, the attribute and the attribute value of the LED module 1050 are selected by using the dial module 1040 and the selection is confirmed by using the button module 1040.

The LED module 1050 sets an inverse attribute value of the LED module 1050 by the external input by using the dial module 1020, the button module 1040, and the display module 1030 (1130). The inverse attribute value is set as an attribute value opposite to the corresponding attribute value and the inverse attribute value of 'Red' may become 'Green'.

The LED module 1050 receives a range setting mode and an external input value for the attribute value of the LED module 1050 by the external input by using the dial module 1020, the button module 1040, and the display module 1030 and determines whether the external input value compared with the attribute value of the LED module 1050 satisfies a set range (1140 and 1150). Since the LED module 1050 is the output module, it may be determined whether the range is satisfied by setting the attribute value to a dummy value.

In the illustrated example, the user selects a range setting mode of '>' of the LED module 1050 by using the dial module 1040 and confirms the selection by using the button module 1040. An attribute to input the external input value and the external input value are input by using the dial module 1020 and the button module 1040. Since the LED module 1050 is the output module, when the external input value compared with the attribute value satisfies the range of '>' while setting the attribute value to the dummy value, a predetermined first attribute value is returned and when the external input value does not satisfy the range of '>', a predetermined second attribute value is returned. In the illustrated example, since the dummy attribute value is '50%' and the external input value is '12%', the external input value compared with the dummy attribute value satisfies the range of '>' and a value of 'RED=100%' is returned.

Further, in the illustrated example, the user selects a range setting mode of '<' of the LED module 1050 by using the dial module 1020 and confirms the selection by using the button module 1040. An attribute to input the external input value and the external input value are input by using the dial module 1020 and the button module 1040. Since the LED module 1050 is the output module, when the external input value compared with the attribute value satisfies the range of '<' while setting the attribute value to the dummy value, a predetermined third attribute value is returned and when the external input value does not satisfy the range of '<', a predetermined fourth attribute value is returned. In the illustrated example, since the dummy attribute value is '50%' and the external input value is '12%', the external input value compared with the dummy attribute value does not satisfy the range of '<' and a value of 'RED=0%' is returned.

FIG. 12 illustrates a module assembly in which an input module and an output module are connected to PnP modules according to an embodiment of the present invention.

In the illustrated example, the module assembly 1200 includes a microphone module 1250 which is the input module and an LED module 1260 which is the output module as a plurality of PnP modules. Further, the module assembly 1200 includes a code transmission module 1210, a dial module 1220, a button module 1240, and a display module 1230.

FIG. 13 is an exemplary diagram of setting the PnP module of the module assembly of FIG. 12 according to an embodiment of the present invention.

When the code transmission module 1210 determines that the user code is not present in the microphone module 1250 or the LED module 1260 and the previously received PnP code is present based on the code information as described in FIGS. 5 and 6, the code transmission module 1210 transmits to the display module 1230 an input message for inputting whether to remove the previously received PnP code (1310). The display module 1230 outputs the input message and selects the microphone module 1250 or the LED module 1260 and selects removal of the PnP code by using the dial module 1220 and the button module 1240 to remove the previously received PnP code from the microphone module 1250 or the LED module 1260.

The microphone module 1250 or the LED module 1260 matches and sets the attribute value of the microphone module 1250 and the attribute value of the LED module 1260 by the external input by using the dial module 1220, the button module 1240, and the display module 1230 (1320). The microphone module 1250 of the illustrated example includes a sound volume and a sound frequency as the attributes and the LED module 1260 includes a basic color and a custom color as the attributes. In the illustrated example, the user selects the attribute matching and setting mode by using the dial module 1220 and confirms the selection by using the button module 1240. Thereafter, the user sets the attribute and the attribute value of the microphone module 1250 by using the dial module 1220 and the button module 1240 and sets the attribute and the attribute value of the LED module 1260 to be matched therewith. In the illustrated example, '56%' which is the attribute value of a sound frequency attribute of the microphone module 1250 is set by matching 'Green' which is the attribute value of a basic color attribute of the LED module 1260.

The microphone module 1250 or the LED module 1260 sets the inverse attribute value of the microphone module 1250 and the inverse attribute value of the LED module 1260 by the external input by using the dial module 1220, the button module 1240, and the display module 1230 (1330). The inverse attribute value is set as an attribute value opposite to the corresponding attribute value and the inverse attribute value of 'Red' may become 'Green'. In the illustrated example, '56%' which is the inverse attribute value of a sound frequency attribute of the microphone module 1250 is set by matching 'Green' which is the attribute value of a basic color attribute of the LED module 1260. '56' which is the inverse attribute value of the sound frequency attribute means '44%' which is the attribute value of the sound frequency attribute.

The microphone module 1250 receives a range setting mode and an external input value for the set attribute value of the microphone module 1250 by the external input by using the dial module 1220, the button module 1240, and the display module 1230 and determines whether the external input value compared with the set attribute value of the microphone module 1250 satisfies a set range (1340 and 1350).

In the illustrated example, the user selects a range setting mode of '>' of the microphone module 1250 by using the dial module 1240 and confirms the selection by using the button module 1240. The user inputs an attribute to input the external input value and the external input value by using the dial module 1220 and the button module 1240. When the external input value compared with the attribute value satisfies the range of '>', a predetermined first attribute value of the LED module 1260 is returned and when the external input value does not satisfy the range of '>', a predetermined second attribute value of the LED module 1260 is returned. In the illustrated example, since the attribute value of the frequency attribute is '32%' and the external input value is '24%', the external input value compared with the attribute value satisfies the range of '>' and a value of 'GREEN=100%' is returned.

Further, in the illustrated example, the user selects a range setting mode of '<' of the microphone module 1250 by using the dial module 1220 and confirms the selection by using the button module 1240. The user inputs an attribute to input the external input value and the external input value by using the dial module 1220 and the button module 1240. When the external input value compared with the attribute value satisfies the range of '<', a predetermined third attribute value of the LED module 1260 is returned and when the external input value does not satisfy the range of '<', a predetermined fourth attribute value of the LED module 1260 is returned. In the illustrated example, since the attribute value of the frequency attribute is '32%' and the external input value is '24%', the external input value compared with the attribute value does not satisfy the range of '<' and a value of 'GREEN=0%' is returned.

According to the embodiment, by using the module assembly 1200 including the microphone module 1250 and the LED module 1260, the number of times when the user claps hands or a clapping intensity are input by using the microphone module 1250, a brightness level, a color, and a blinking cycle of the LED module 1260 are matched with an input attribute of the microphone module 1250, and a range is set to provide various user experiences.

Further, according to an embodiment of the present invention, by using a module assembly including an infrared module and a motor module, a degree at which the user approaches is input by using the infrared module and a speed of the motor module is matched with an input attribute of the infrared module and the range is set to provide various user experiences such as a case where an animal-shaped motor module runs away rapidly as the user approaches, etc.

Further, according to an embodiment of the present invention, by using a module assembly including a gyroscope module and a motor module, an angle, an acceleration, and an angular speed of an X/Y/Z axis are input by using the gyroscope module, a speed of the motor module is matched with the input attribute of the gyroscope module, and the range is set to provide various user experiences such as a case where the motor module moves rapidly in a predetermined direction when a predetermined angle, a predetermined acceleration, and a predetermined angular speed are input, etc.

Combinations of each block of the accompanying block diagram and each step of the flowchart are constituted by firmware, software, or hardware. The combinations may be performed by an algorithm or computer program instructions. Since the algorithm or computer program instructions may be mounted on a universal computer, a special computer or a processor of other programmable digital signal processing device, the instructions performed by the computer or a processor of other programmable data processing equipment generate a means of performing functions described in each block of the block diagram or each step of the flowchart.

Since the algorithm or computer program instructions may also be stored in a computer usable or computer readable memory which may direct a computer or other programmable data processing equipment in order to implement a function in a specific scheme, the instructions stored in the computer usable or computer readable memory can also produce manufacturing items including an instruction means performing a function described in each block of the block diagram or each step in the flowchart. Since the computer program instructions can also be mounted on the computer or other programmable data processing equipment, instructions that perform the computer or other programmable data processing equipment by generating a processor executed by the computer as a series of operational steps are performed on the computer or other programmable data processing equipment can provide steps for executing the functions described in each block of the block diagram or each step in the flowchart.

Further, each block or each step may represent a part of a module, a segment, or a code that includes one or more executable instructions for executing a specified logical function(s). In addition, it should also be noted that in some alternative embodiments, the functions mentioned in the blocks or steps may occur out of order. For example, two successive blocks or steps illustrated may in fact be performed substantially concurrently or the blocks or steps may be sometimes performed in a reverse order according to the corresponding function.

Although the present invention have been described in detail with reference to the embodiments, the present invention is not limited thereto and may be modified and implemented in many different forms without departing from the technical concept of the present invention. Accordingly, the various embodiments disclosed herein are not intended to limit the technical spirit but describe the technical spirit and the scope of the technical spirit is not limited by the embodiments. The protection scope of the present invention should be construed based on the following appended claims and it should be appreciated that the technical spirit included within the scope equivalent to the claims belongs to the claims of the present invention.

A device according to an exemplary embodiment of the present invention may include a bus coupled to each unit of the device illustrated in the figure and at least one processor coupled to the bus and may include a memory coupled to the bus for storing a command, a received message, or a generated message and coupled to at least one processor for performing the commands described above.

Further, the system according to the present invention may be implemented as a computer readable code in a computer readable recording medium. The computer readable recording medium includes all kinds of recording devices storing data which may be deciphered by a computer system. The computer readable recording medium includes magnetic storage media (e.g., a ROM, a floppy disk, a hard disk, and the like) and optical reading media (e.g., a CD-ROM, a DVD, and the like). Further, the computer readable recording media may store and execute codes which may be distributed in the computer system connected through a network and read by a computer in a distribution method.

The invention claimed is:

1. A module assembly comprising:
    a code transmission module including a functional unit including a PnP code transmission unit transmitting a PnP code to at least one PnP module; and
    the at least one PnP module driven by receiving the PnP code from the code transmission module,
    wherein the PnP code is a code to drive the PnP module including a different functional unit from the code transmission module,
    wherein the module assembly further includes a dial module, a button module, and a display module,
    wherein the PnP module includes at least one of an input module and an output module,
    wherein the input module is at least one of an environment module, a button module, a gyroscope module, a microphone module, an infrared module, a dial module, and an ultrasound module,
    wherein the output module is at least one of an LED module, a speaker module a display module, a motor controller module, and a motor module,
    wherein the PnP module sets an attribute value of the PnP module by an external input by using the dial module, the button module, and the display module,
    wherein the PnP module receives a range setting mode for the attribute value of the PnP module and an external input value by using the external input by using the dial module, the button module, and the display module and determines whether the external input value compared with the attribute value of the PnP module satisfies a set range, and
    wherein when the PnP module includes the input module and the output module, the PnP module matches and sets the attribute value of the input module and the attribute value of the output module by the external input by using the dial module, the button module, and the display module.

2. The module assembly of claim 1, wherein the code transmission module further includes a memory, and
    the PnP code is acquired from the memory of the code transmission module.

3. The module assembly of claim 1, wherein the code transmission module further includes a module information receiving unit and an assembly information receiving unit,
    the module information receiving unit receives module information from the PnP module, and
    the assembly information receiving unit receives assembly information from the PnP module.

4. The module assembly of claim 3, wherein the module information includes module unique information and a module category, and
    the module category represents information to classify the modules according to a function of the PnP module.

5. The module assembly of claim 3, wherein the assembly information includes neighboring module information and a connection direction of the PnP module, and
    the neighboring module information includes the module unique information and the module category.

6. The module assembly of claim 1, wherein the code transmission module further includes a code information request unit and a code information receiving unit,
    the code information request unit requests code information and a PnP mode to the PnP module,
    the code information receiving unit receives the code information and the PnP mode from the PnP module,
    the code information includes information indicating whether a user code prepared by a user and a PnP code previously received from the code transmission module are present in the PnP module, and
    the PnP mode includes an on or off setting state of the PnP mode.

7. The module assembly of claim 6, wherein the module assembly further includes a display module and the code transmission module further includes an output message transmission unit,
    when the code transmission module determines that the user code is not present in the PnP module, but the previously received PnP code is present in the PnP module based on the code information, the output message transmission unit transmits to the display module an input message for inputting whether to remove the previously received PnP code, and
    when the code transmission module determines that the user code and the previously received PnP code are not present in the PO module and the PnP mode is an on state based on the code information, the output message transmission unit transmits to the display module an input message for selecting the PnP code.

8. The module assembly of claim 1, wherein the code transmission module is a network module.

9. A plug and play system comprising
    a module assembly including a code transmission module including a functional unit including a PnP code transmission unit transmitting a PnP code to at least one PnP module, and the at least one PnP module driven by receiving the PnP code from the code transmission module; and
    a PnP code providing server connected to the module assembly through a network,
    wherein the PnP code is a code to drive the PnP module including a different functional unit from the code transmission module,
    wherein the module assembly further includes a dial module, a button module, and a display module,
    wherein the PnP module includes at least one of an input module and an output module,
    wherein the input module is at least one of an environment module, a button module, a gyroscope module, a microphone module, an infrared module, a dial module, and an ultrasound module,
    wherein the output module is at least one of an LED module, a speaker module, a display, module, a motor controller module, and a motor module,
    wherein the PnP module sets an attribute value of the PnP module by an external input by using the dial module, the button module, and the display module,
    wherein the PnP module receives a range setting mode for the attribute value of the PnP module and an external input value by using the external input by using the dial module, the button module, and the display module and determines whether the external input value compared with the attribute value of the PnP module satisfies a set range, and
    wherein when the PnP module includes the input module and the output module, the PnP module matches and sets the attribute value of the input module and the attribute value of the output module by the external input by using the dial module, the button module and the display module.

10. The plug and play system of claim 9, wherein the PnP code is received from the PnP code providing server.

11. The plug and play system of claim 10, wherein the code transmission module further includes a module information receiving unit and an assembly information receiving unit,
  the module information receiving unit receives module information from the PnP module, and
  the assembly information receiving unit receives assembly information from the PnP module.

12. The plug and play system of claim 11, wherein the module information includes module unique information and a module category, and
  the module category represents information to classify the modules according to a function of the PnP module.

13. The plug and play system of claim 11, wherein the assembly information includes neighboring module information and a connection direction of the PnP module, and
  the neighboring module information includes the module unique information and the module category.

14. The plug and play system of claim 11, wherein the code transmission module further includes a PnP code request unit and a PnP code receiving unit,
  the PnP code request unit transmits the module information and the assembly information to the PnP code providing server to request the PnP code, and
  the PnP code receiving unit receives the PnP code of the PnP module from the PnP code providing server as a response to the PnP code request.

15. The plug and play system of claim 9, wherein the code transmission module further includes a code information request unit and a code information receiving unit,
  the code information request unit requests code information and a PnP mode to the PnP module,
  the code information receiving unit receives the code information and the PnP mode from the PnP module,
  the code information includes information indicating whether a user code prepared by a user and a PnP code previously received from the code transmission module are present in the PnP module, and
  the PnP mode includes an on or off setting state of the PnP mode.

16. The plug and play system of claim 15, wherein the module assembly further includes a display module and the code transmission module further includes an output message transmission unit,
  when the code transmission module determines that the user code is not present in the PnP module, but the previously received PnP code is present in the PnP module based on the code information, the output message transmission unit transmits to the display module an input message for inputting whether to remove the previously received PnP code, and
  when the code transmission module determines that the user code and the previously received PnP code are not present in the PnP module and the PnP mode is an on state based on the code information, the output message transmission unit transmits to the display module an input message for selecting the PnP code.

17. The plug and play system of claim 9, wherein the code transmission module is a network module.

* * * * *